United States Patent
Hultholm et al.

(10) Patent No.: US 7,811,534 B2
(45) Date of Patent: Oct. 12, 2010

(54) METHOD FOR THE TREATMENT OF COPPER-BEARING MATERIALS

(75) Inventors: Stig-Erik Hultholm, Pori (FI); Seppo Heimala, Pori (FI); Teemu Ritasalo, Harjavalta (FI); Mikko Ruonala, Kantvik (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 11/815,678

(22) PCT Filed: Feb. 13, 2006

(86) PCT No.: PCT/FI2006/000046

§ 371 (c)(1),
(2), (4) Date: Aug. 7, 2007

(87) PCT Pub. No.: WO2006/084950

PCT Pub. Date: Aug. 17, 2006

(65) Prior Publication Data

US 2008/0152558 A1   Jun. 26, 2008

(30) Foreign Application Priority Data

Feb. 14, 2005 (FI) ................................. 20050160

(51) Int. Cl.
*B01D 11/00* (2006.01)
(52) U.S. Cl. .............................. 423/27; 423/26; 423/37
(58) Field of Classification Search .................. 423/27, 423/26, 37
See application file for complete search history.

(56) References Cited

U.S. PATENT DOCUMENTS

| 1,925,391 | A | * | 9/1933 | Kohlmeyer | ................... 75/433 |
| 1,939,068 | A | * | 12/1933 | Lemmon | .................... 209/167 |
| 3,891,522 | A | | 6/1975 | McKay et al. | |
| RE28,570 | E | * | 10/1975 | Tylko | .......................... 373/23 |
| 4,242,129 | A | | 12/1980 | Kausel et al. | |
| 4,256,553 | A | | 3/1981 | Baczek et al. | |
| 5,616,168 | A | | 4/1997 | Gabb et al. | |
| 5,855,770 | A | * | 1/1999 | Clark et al. | .................. 209/166 |
| 6,761,749 | B1 | * | 7/2004 | Poijarvi et al. | ............. 75/10.35 |
| 2004/0200730 | A1 | * | 10/2004 | Jibiki | .......................... 205/508 |
| 2006/0272454 | A1 | * | 12/2006 | Heimala et al. | ................ 75/743 |

FOREIGN PATENT DOCUMENTS

| DE | 864918 C | 1/1953 |
| WO | 2005007901 | 1/2005 |
| WO | 2005007902 | 1/2005 |
| WO | 2005007905 | 1/2005 |

OTHER PUBLICATIONS

Jukart, Matjaz, Supplementary European Search Report, Aug. 25, 2009.

* cited by examiner

*Primary Examiner*—Melvin C Mayes
*Assistant Examiner*—Melissa Stalder
(74) *Attorney, Agent, or Firm*—Chernoff, Vilhauer, McClung & Stenzel, LLP

(57) ABSTRACT

The present invention relates to a method for the treatment of copper-bearing materials, such as copper concentrates, so that the impurities and gangue minerals in the materials, such as silicates, are in effect removed completely.

21 Claims, 2 Drawing Sheets

METHOD FOR THE TREATMENT OF COPPER-BEARING MATERIALS

Figure 1:
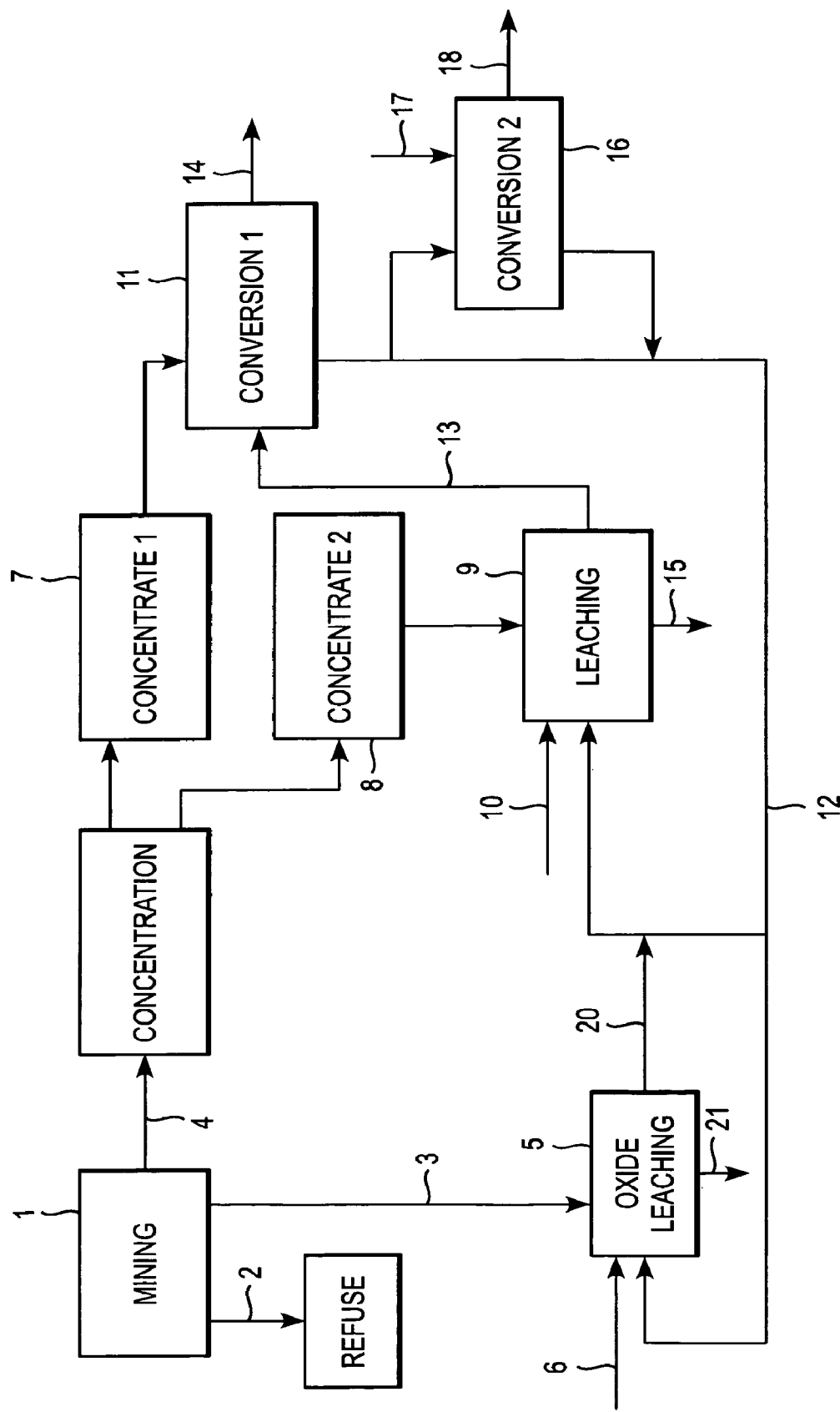

This is a national stage application filed under 35 USC 371 based on International Application No. PCT/FI2006/000046 filed Feb. 13, 2006, and claims priority under 35 USC 119 of Finnish Patent Application No. 20050160 filed Feb. 14, 2005.

The present invention relates to a method for the treatment of copper-bearing materials, such as copper concentrates, so that the impurities and gangue minerals in the materials, such as silicates, are in effect removed completely.

Methods are known from WO patent applications 2005/007905, 2005/007902 and 2005/007901, in which copper, nickel and precious metals are effectively turned into sulphidic intermediate products with high copper content and sufficient caloric value using concentration and hydrometallurgical methods. This occurs in solution according to example reaction (1)

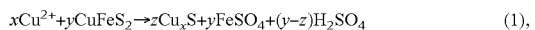

$$xCu^{2+}+yCuFeS_2 \rightarrow zCu_xS+yFeSO_4+(y-z)H_2SO_4 \qquad (1),$$

where the copper in solution is turned into copper sulphide form by conversion using iron-containing sulphide material. A conversion reaction occurring with the same kind of iron-containing sulphide material is used for example to recover nickel and precious materials from solution as well in nickel-copper matte leaching.

By exploiting the known methods described in the above-mentioned WO patent applications 2005/007905, 2005/007902 and 2005/007901, the iron content for instance of copper concentrate can be effectively reduced. However, some problems arise in these methods from time to time, because the copper concentrate obtained in conversion still contains gangue minerals, such as silicates. If this kind of iron-depleted copper concentrate is used for example in copper smelting, these silicates require the addition of iron, so that the slag can be made sufficiently liquid to get the slag out of the smelter at the desired temperature. As a result, the amount of copper smelting slag increases.

The purpose of the present invention is to eliminate the disadvantages of the prior art and to achieve an improved method for the treatment of copper-bearing materials, such as copper concentrates, so that the impurities and gangue minerals in the materials, such as silicates, can in effect be removed completely. The essential features of the invention will be made apparent in the attached claims.

In the method according to the invention, conditions are applied to the copper-bearing material to be treated, such as copper concentrate, in the presence of firstly an acid, such as sulphuric acid, hydrochloric acid or an equivalent acid, and an oxygen-containing gas such as oxygen, air or oxygen-enriched air, in which the copper obtained in solution is turned by conversion with a material containing iron sulphide into copper sulphide form, using the principle reaction (1) presented above. The sulphuric acid—ferrous sulphate solution thus generated also contains the impurities of the leached copper-bearing material, such as arsenic, antimony, bismuth, uranium, zinc, nickel and cobalt contents. With the copper sulphide formed by conversion the gangue minerals e.g. silicates, can be made to separate according to the invention by flotation and/or a method based on differences in specific weight.

In the flotation of the material containing copper sulphide obtained by conversion according to the invention, the flotation process is preferably carried out so that the copper sulphides and the precious metals with them in the copper sulphide containing material are frothed, so that the gangue minerals, such as silicates, are made to enter the residue of the flotation process by means of depressant chemicals. The flotation process may also be carried out so that the gangue minerals, such as silicates, are frothed and the copper-bearing sulphide material together with the precious metals is recovered in the residue of the flotation process by means of depressant chemicals. When proceeding in either way, specified electro-chemical potential or electro-chemical alternating current spectroscopic methods using mineral electrodes can be exploited advantageously in the flotation process. The separation of gangue minerals is improved and the iron content of the copper sulphide product of conversion is reduced beneficially when the conversion temperature is maintained in a range between 170-260° C., preferably between 200-220° C.

If there is a substantial amount of chlorides and/or fluorides in the water used in the leaching or other treatment of copper-bearing material, not only gangue minerals such as silicates, but also halides, such as chlorides and/or fluorides for example, can be separated effectively from the usually coarse copper sulphide material obtained in conversion, the majority preferably even during the water separation of the copper sulphide material obtained in conversion. This is possible due to the coarseness and thus excellent filterability and low residual moisture of the copper sulphide conversion product. The separation of the copper sulphide material and the halides can be intensified by performing filtration and/or washing of the copper sulphide material in reductive conditions, which are achieved using chemicals and/or an electric current.

The method according to the invention is very practicable for various copper-bearing materials and many localized water supply and water quality problems. The method according to the invention can be used when treating copper scrap, smelter dust and copper-zinc-lead ores in addition to copper-bearing ores. The last mentioned ores often include minerals containing precious metals such as arsenopyrite or pyrite, which can be converted to copper sulphide minerals, which contain said precious metals according to the method. Furthermore, the method according to the invention allows the use of salt-containing water, e.g. seawater, as process water. These presuppose that process parameters obtained using known methods as such are exploited when regulating the process e.g. by using mineral electrodes and catalysts in process optimisation and the use of various leaching stages, such as heap leaching, for example to regulate the copper and acid balances in the overall process. In this way the object of the invention i.e. the separation of copper sulphide and gangue minerals can be intensified.

There is still some degree of copper and other valuable components in the silicate-containing fraction rich in $SiO_2$ obtained from the separation process carried out after conversion preferably by flotation. The copper and other valuable components in the $SiO_2$-rich fraction can be recovered by leaching the fraction separately or during a leaching stage related to some other overall copper-bearing material process. The $SiO_2$-rich fraction can also be returned to the flotation of the original copper-bearing ore. In addition a partial separation of the coarse sulphides can be performed if necessary on the $SiO_2$-rich fraction from the post-conversion separation stage, before further treatment. Further, the gangue mineral product obtained from the post-conversion separation stage, the removal of gangue minerals, can be routed by means of mineral electrodes to electro-chemically controlled further processing, such as for instance leaching or flotation.

When the method of the invention is applied e.g. to slag from a copper smelting process, the copper content of the slag is first turned into sulphide form by conversion and the gangue mineral content e.g. the silicon dioxide ($SiO_2$) content of the slag decreases in the flotation of the sulphide product obtained by conversion. When feeding the copper sulphide-containing flotation product with low $SiO_2$ content thus obtained back to a smelter that uses sulphidic copper raw material, the amount of slag exiting the smelter is in effect reduced by this amount.

Due to the low $SiO_2$ content, the slag obtained from the smelting of sulphidic copper-bearing material can be treated in several ways. The slag can advantageously be granulated for example and leached separately or together with the dust from the smelting of copper-bearing material and the $SiO_2$-rich fraction obtained in post-conversion flotation with iron-containing sulphide according to the invention. In this way the copper and other valuable components remaining in connection with the $SiO_2$ fraction are made to dissolve at least partially, and thus are available for further processing without the copper requiring further slag treatment. The slag obtained from the smelting of copper-bearing material can also be treated pyrometallurgically, preferably for example by smelting in an electric furnace. In this way any potential deficiency in soluble copper entering copper conversion is filled by leaching additional other copper-bearing raw materials to keep the copper conversion copper balance beneficial.

When exploiting the copper-bearing material treated with the method according to the invention in copper smelting, the $Cu/Fe/SiO_2$ ratios of the copper entering smelting and of the copper-rich conversion product obtained by conversion are vitally important with regard to the final smelting result, and these $Cu/Fe/SiO_2$ ratios can preferably be adjusted in conversion and in the related gangue mineral separation irrespective of essentially different copper-bearing raw materials, with mineral electrode measurements, for instance using electrochemical potential. The sulphur balance prevailing in the total process must also be taken into account in mineral electrode measurements, in which the sub-components include notably $S^{2-}$ ions, elemental sulphur $S^0$ and sulphate sulphur $SO_4^{2-}$. When using the method of the invention, whereby the essentially copper sulphide free phase of the gangue minerals can be fed onwards to e.g. copper smelting, and the $SiO_2$-containing fraction of the gangue minerals such as silicates can be treated to remove the copper remaining in the $SiO_2$-containing fraction effectively, the copper yield of the overall process can be made extremely high in the final copper-containing product such as raw copper, optimally above 99%.

When the method of the invention is applied to the smelting of copper-bearing material, the leaching of the material being processed, the conversion of copper into sulphide, and the separation of gangue minerals such as silicates from the sulphidic conversion product, can also be carried out completely separately from the smelting process, even in geographical terms. That which is transported in this case between gangue mineral separation and copper recovery is usually copper sulphide concentrate containing 65-77% copper.

Figure 2:
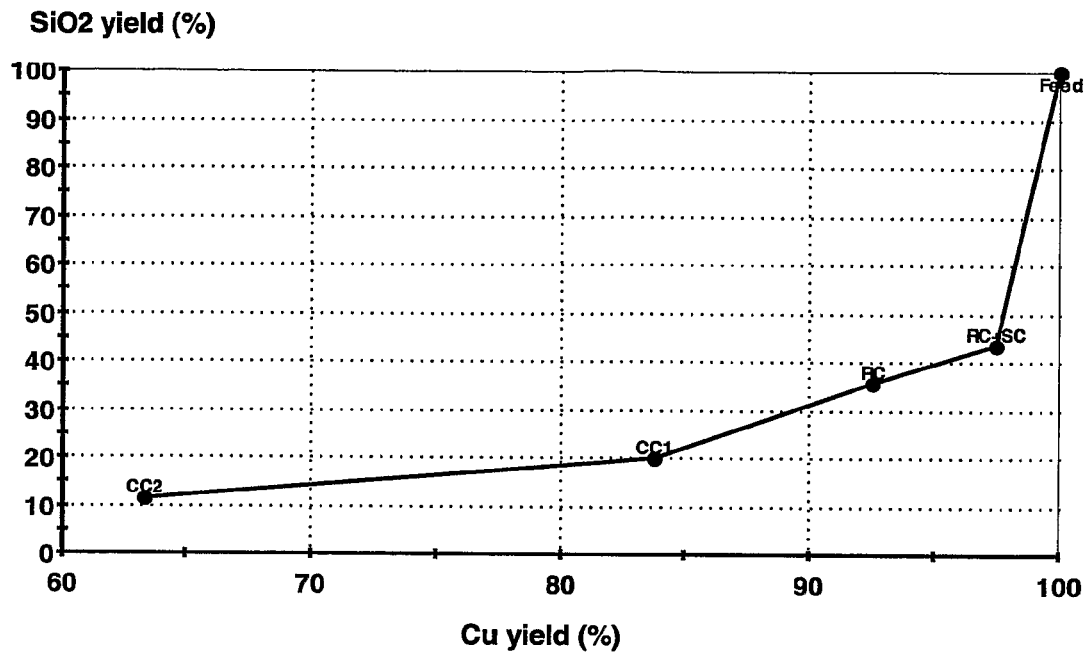
Figure 3:
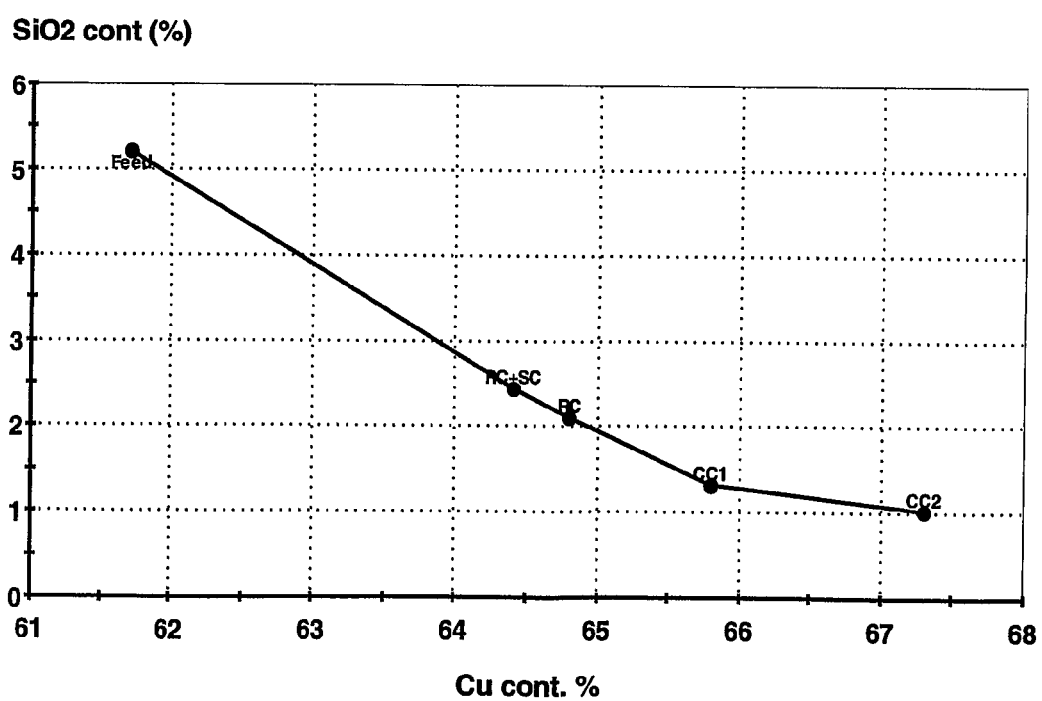

The invention is described below in more detail with reference to the appended drawings, in which FIG. 1 presents a flow chart of one preferred embodiment of the invention applied to copper smelting, FIG. 2 presents the results of the copper and $SiO_2$ fraction yield correlation in post-conversion flotation, and FIG. 3 shows the results of the copper and $SiO_2$ fraction content ratio in post-conversion flotation.

According to FIG. 1, ore 1 containing copper sulphide and possibly other valuable components is routed to flotation 2 to obtain copper sulphide concentrate 3 that contains the valuable components. The copper sulphide concentrate obtained from flotation is routed onwards to leaching 4. Leaching 4 is performed in the presence of sulphuric acid 5 and an oxidising reagent, such as oxygen 6, preferably at a temperature of 220° C., and the copper in the copper sulphide concentrate dissolves in leaching 4 into $Cu^+/Cu^{++}$ ions. After leaching 4, the dissolved copper undergoes conversion 7 at a temperature of 220° C. in the presence of material containing iron sulphide 31 according to principal reaction (1) in order to obtain copper sulphide product, ferrous sulphate and sulphuric acid. This solution of sulphuric acid and ferrous sulphate also contains the impurities in the leached copper sulphate concentrate, such as arsenic, uranium, zinc, nickel and cobalt contents.

The flow sheet shown in FIG. 1 also describes the passage of the flotation residue 8 obtained from the copper-bearing ore flotation stage 2 to hydrometallurgical treatment 9, where leaching in the presence of an oxygen-containing reagent 11 is performed on the flotation residue, followed by extraction and stripping of the solution obtained with sulphuric acid 10. Since the ferrous salt-oxygen solution 25 from conversion 7 containing impurities can advantageously be routed to this hydrometallurgical treatment 9, this treatment 9 can function as a base for the recovery or removal of impurities in copper-bearing raw material, such as arsenic entering the waste 28, and other products 30, such as uranium, zinc, lead, nickel and cobalt. Furthermore, the copper sulphate solutions 26 and 27 that contain sulphuric acid obtained from the leaching and extraction stage of hydrometallurgical treatment 9 can also be fed to the leaching stage 4 in addition to the conversion stage 7.

The copper sulphide product 12 obtained in conversion 7 using copper sulphate and sulphuric acid is routed according to the invention to the removal of gangue materials, such as silicates, by flotation 13. The copper sulphide product 14 obtained from flotation 13 is taken to the flash smelter 15 for raw copper fabrication. The flotation residue 16 obtained from flotation 13, which contains gangue materials, such as silicates, is returned to the original flotation 2 of copper-bearing ore 1.

The raw copper 33 obtained from the flash smelter 15 is routed in molten form to the anode furnace 17 and also on to be cast from molten raw copper as anodes suitable for the electrolytic refining 18 of copper. The impure copper sulphate solution 19 containing sulphuric acid, obtained from electrolytic refining 18, is recirculated back to copper sulphide concentrate leaching 4, whereas cathodes are formed from the copper, and are used as raw material for the further processing of copper. Flash smelter dust 32 can be returned for example to hydrometallurgical treatment 9, into which other copper-containing raw materials 34 can also be fed if necessary.

The slag 20 obtained from the flash smelter 15 is routed to an electric furnace 21 and on to slag concentration, from where the copper-rich phase 24 obtained is conveyed back to the smelter 15 to be re-smelted. The exhaust gases 22 from the smelter 15 are routed to the sulphuric acid plant 23, and the sulphuric acid from there can be used in copper concentrate leaching 4.

EXAMPLE

To test the method of the invention, the four separate tests mentioned in Tables 1 and 2 were carried out first, where conversion was performed on materials containing copper-containing copper minerals, such as chalcopyrite ($CuFeS_2$), bornite ($Cu_5FeS_4$) and digenite ($Cu_{2-x}S$), and gangue minerals such as silicates and iron oxides, in the presence of iron-containing sulphide, such as e.g. pyrite ($FeS_2$) or arsenopyrite (FeAsS). The total $SiO_2$ content of the gangue minerals in the materials processed was 5.2% by weight.

In tests 1-3, the copper solution was brought to conversion directly from copper-bearing material leaching and partially concentrated by means of liquid-liquid extraction of copper after heap leaching. In test 4, a combined leaching and conversion test was carried out, in which the first interval from 0-30 min was the leaching stage and the 30-60 min interval was the conversion stage. The process stages were monitored and regulated using mineral and platinum electrodes and, for instance, the energy levels of the electrodes in the conversion stage were kept between +300-+370 mV vs. AgCl/Ag.

TABLE 1

Fe content as a function of time

| | | Fe, % time, min | | |
|---|---|---|---|---|
| Test | ° C. | 0 | 30 | 60 |
| 1 | 160 | 14.5 | 8.3 | 7.2 |
| 2 | 190 | 14.5 | 7.4 | 5.0 |
| 3 | 220 | 14.5 | 1.85 | 1.8 |
| 4 | 220 | 14.5 | 6.1 | 2.6 |

TABLE 2

Cu content as a function of time

| | | Cu, g/l time, min | | |
|---|---|---|---|---|
| Test | ° C. | 0 | 30 | 60 |
| 1 | 160 | 59 | 38.7 | 27.6 |
| 2 | 190 | 59 | 10.8 | 4.1 |
| 3 | 220 | 41 | 0 | 0 |
| 4 | 220 | 9.5 | 0.45 | 0.008 |

According to Tables 1 and 2 the conversion temperature in tests 1-3 was 160° C., 190° C. and 220° C. respectively, whereas in test 4 both the leaching temperature and the conversion temperature was 220° C. Table 1 shows the change of iron content in the solids during conversion as a function of time and Table 2 shows the copper content of the solution as a function of time. In tests 1-3 the $SiO_2$ content of the solids remained almost constant, whereas in test 4 the final $SiO_2$ content almost doubled.

The method according to the invention was applied to the final residue from test 3, which was floated to recover the copper sulphide and precious metal contents still in the final sediment. The results of flotation are given in FIGS. 2 and 3. FIG. 2 shows the yield dependency of the copper and $SiO_2$ fractions and FIG. 3 shows the content ratio of the copper and $SiO_2$ fractions. The terms used in FIGS. 2 and 3 mean the following: RC rough concentrate, SC scavenger concentrate, CC1 concentrate from the first cycle and CC2 concentrate from the second cycle. Flotation was performed so that the material was first pre-frothed, then scavenging was performed on the rough concentrate. In this way repeat flotation was performed on the resulting concentrate in two stages.

In FIG. 2 the yield dependency of the copper and $SiO_2$ fractions is described in a graph, where the x-axis shows the copper yield (wt. %) and the y-axis the yield of $SiO_2$ (wt. %). In FIG. 2 the starting point (feed) is that the yield from each fraction is 100 wt. %. The graph shows that after rough concentration and scavenger concentration the $SiO_2$ yield has fallen to about 40% of the starting point, whereas the copper yield is about 95% of the starting point. After two repeat concentration cycles (CC2) there is only about 10% of the original yield of $SiO_2$, which means that about 90% of the $SiO_2$ content has been removed. On the other hand, there is still about 63% of the original copper content.

In FIG. 3 the content dependency of the copper and $SiO_2$ fractions is depicted in a graph, where the x-axis shows the copper content (wt. %) and the y-axis the $SiO_2$ content (wt. %). At the starting point of flotation (feed) the $SiO_2$ content is 5.2 wt. % and the copper content about 61.7 wt. %. After the two repeat flotation stages the $SiO_2$ content has fallen to a value of 1.0 wt. %, whereas the copper content has risen to a value of 67.5 wt. %

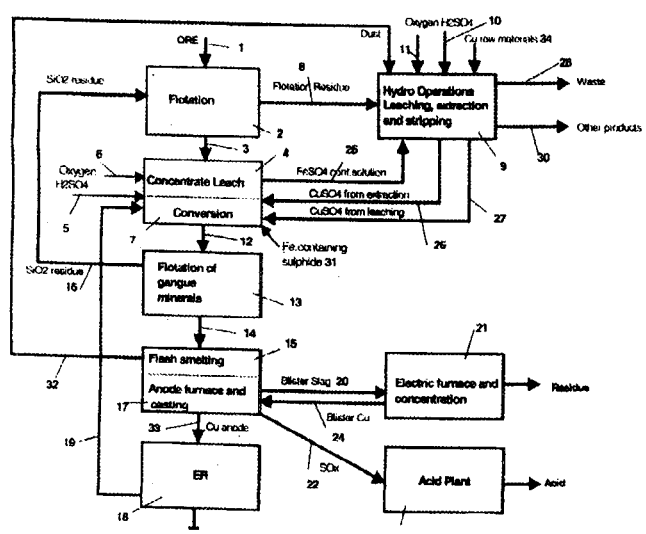

The invention claimed is:

1. A method for treating copper-bearing material, comprising:
    leaching the copper-bearing material,
    converting the leaching product in the presence of material containing iron sulphide in order to produce copper sulphide,
    carrying out gangue mineral separation on the copper sulphide produced by the converting step before further processing of said copper sulphide, and
    routing the copper sulphide produced by gangue mineral separation to a smelter for the fabrication of raw copper.

2. A method according to claim 1, comprising carrying out gangue mineral separation by flotation.

3. A method according to claim 2, comprising floating valuable components of the copper sulphide apart from the gangue minerals during gangue mineral separation.

4. A method according to claim 2, comprising floating gangue minerals apart from the valuable components of the copper sulphide during gangue mineral separation.

5. A method according to claim 1, comprising carrying out gangue mineral separation on the basis of the difference in specific weight.

6. A method according to claim 1, comprising carrying out the copper sulphide conversion preceding gangue mineral separation at a temperature range of 170-260° C. in order to improve the separation of gangue minerals.

7. A method according to claim 6, comprising carrying out the copper sulphide conversion preceding gangue mineral separation at a temperature range of 200-220° C.

8. A method according to claim 1, comprising routing the gangue mineral produced by gangue mineral separation to the leaching that precedes copper sulphide conversion.

9. A method according to claim 1, comprising routing the gangue mineral product obtained from gangue mineral separation to further processing that is controlled electrochemically by means of mineral electrodes.

10. A method according to claim 1, comprising employing electrochemical potential measurement with mineral electrodes in the gangue mineral separation.

11. A method according to claim 1, comprising employing an alternating current spectroscopic method in the gangue mineral separation.

12. A method according to claim 1, comprising separating water from the copper sulphide material produced by the converting step.

13. A method according to claim 12, comprising separating halides during the step of separating water from the copper sulphide material produced by the converting step.

14. A method according to claim 9, wherein said further processing is leaching or flotation.

15. A method for treating an ore that contains copper in sulphide form, comprising:

producing a copper sulphide concentrate by flotation treatment of the ore, leaching the copper sulphide concentrate in the presence of sulphuric acid to form a leaching product containing dissolved copper, converting the leaching product in the presence of material containing iron sulphide in order to produce copper sulphide, carrying out gangue mineral separation on the copper sulphide produced by the converting step before further processing of said copper sulphide, and routing said copper sulphide to flash smelting for raw copper fabrication.

16. A method according to claim 15, comprising routing gangue minerals from the gangue mineral separation step to the copper sulphide concentrate production step.

17. A method according to claim 15, comprising routing flotation residue from the copper sulphide concentrate production step to hydrometallurgical treatment, routing said copper sulphide to flash smelting for raw copper fabrication, and routing flash smelter dust to said hydrometallurgical treatment.

18. A method according to claim 17, wherein the hydrometallurgical treatment extracts copper as copper sulphate from the flotation residue and smelter dust and the method comprises routing copper sulphate from the hydrometallurgical treatment to the converting step.

19. A method according to claim 15, wherein said gangue mineral is rich in $SiO_2$ and the method further comprises routing said gangue mineral from the gangue mineral separation step to a leaching step, whereby copper present in the gangue mineral may be removed.

20. A method according to claim 19, comprising routing said gangue mineral from the gangue mineral separation step to said flotation treatment whereby said gangue mineral passes from said flotation treatment to the step of leaching the copper sulphide concentrate for removing copper present in the gangue mineral.

21. A method for treating an ore that contains copper in sulphide form and gangue mineral that is rich in $SiO_2$, comprising:

carrying out a first flotation treatment on the ore to produce a copper sulphide concentrate, leaching the copper sulphide concentrate in the presence of sulphuric acid to form a leaching product containing dissolved copper, converting the leaching product in the presence of material containing iron sulphide in order to produce copper sulphide, carrying out a second flotation treatment on the copper sulphide produced by the converting step before further processing of said copper sulphide to separate the gangue mineral from the copper sulphide, routing said copper sulphide from the second flotation treatment to flash smelting for raw copper fabrication, and routing said gangue mineral from the second flotation treatment to the first flotation treatment, whereby copper present in the gangue mineral is separated from the gangue mineral in the leaching step.

* * * * *

UNITED STATES PATENT AND TRADEMARK OFFICE
CERTIFICATE OF CORRECTION

Page 1 of 2

PATENT NO. : 7,811,534 B2
APPLICATION NO. : 11/815678
DATED : October 12, 2010
INVENTOR(S) : Stig-Erik Hultholm et al.

It is certified that error appears in the above-identified patent and that said Letters Patent is hereby corrected as shown below:

The title page should be deleted to appear as per attached title page.

The sheets of drawing consisting of figure 1 should be deleted to appear as per attached figure.

FIG. 1 should be as shown below:

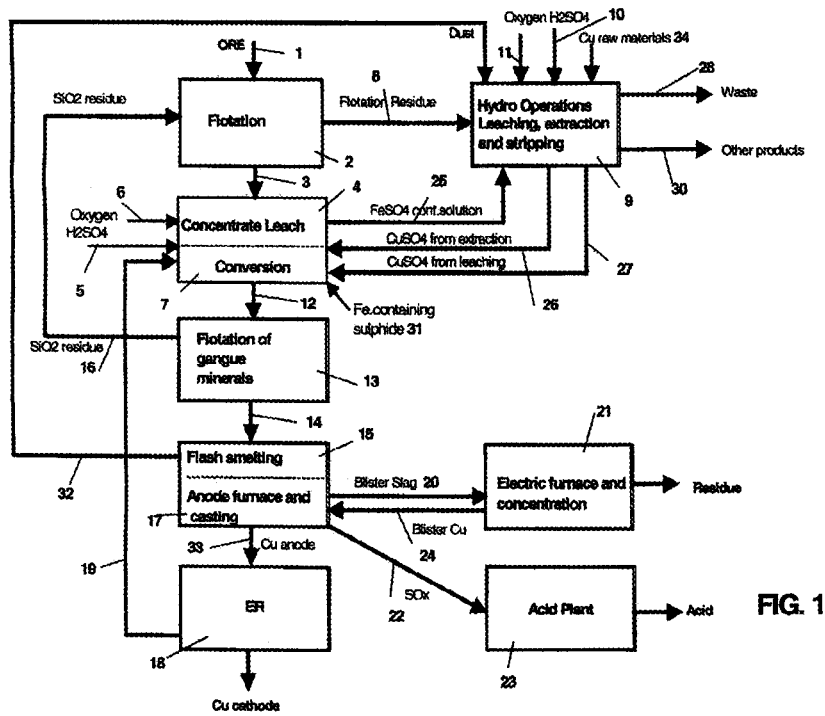

Signed and Sealed this
Twenty-sixth Day of June, 2012

David J. Kappos
*Director of the United States Patent and Trademark Office*

CERTIFICATE OF CORRECTION (continued)

(12) United States Patent
Hultholm et al.

(10) Patent No.: US 7,811,534 B2
(45) Date of Patent: Oct. 12, 2010

(54) METHOD FOR THE TREATMENT OF COPPER-BEARING MATERIALS

(75) Inventors: Stig-Erik Hultholm, Pori (FI); Seppo Heimala, Pori (FI); Teemu Ritasalo, Harjavalta (FI); Mikko Ruonala, Kantvik (FI)

(73) Assignee: Outotec Oyj, Espoo (FI)

(*) Notice: Subject to any disclaimer, the term of this patent is extended or adjusted under 35 U.S.C. 154(b) by 0 days.

(21) Appl. No.: 11/815,678

(22) PCT Filed: Feb. 13, 2006

(86) PCT No.: PCT/FI2006/000046

§ 371 (c)(1),
(2), (4) Date: Aug. 7, 2007

(87) PCT Pub. No.: WO2006/084950

PCT Pub. Date: Aug. 17, 2006

(65) Prior Publication Data

US 2008/0152558 A1  Jun. 26, 2008

(30) Foreign Application Priority Data

Feb. 14, 2005  (FI)  ................. 20050160

(51) Int. Cl.
*B01D 11/00*  (2006.01)

(52) U.S. Cl. ............................ 423/27; 423/26; 423/37

(58) Field of Classification Search ............ 423/27, 423/26, 37
See application file for complete search history.

(56) References Cited

U.S. PATENT DOCUMENTS

| 1,925,391 | A | * | 9/1933 | Kohlmeyer | 75/433 |
| 1,939,068 | A | * | 12/1933 | Lemmon | 209/167 |
| 3,891,522 | A | | 6/1975 | McKay et al. | |
| RE28,570 | E | * | 10/1975 | Tylko | 373/23 |
| 4,242,129 | A | | 12/1980 | Kausel et al. | |
| 4,256,553 | A | | 3/1981 | Baczek et al. | |
| 5,616,168 | A | | 4/1997 | Gabb et al. | |
| 5,855,770 | A | * | 1/1999 | Clark et al. | 209/166 |
| 6,761,749 | B1 | * | 7/2004 | Poijarvi et al. | 75/10.35 |
| 2004/0200730 | A1 | * | 10/2004 | Jibiki | 205/508 |
| 2006/0272454 | A1 | * | 12/2006 | Heimala et al. | 75/743 |

FOREIGN PATENT DOCUMENTS

| DE | 864918 C | 1/1953 |
| WO | 2005007901 | 1/2005 |
| WO | 2005007902 | 1/2005 |
| WO | 2005007905 | 1/2005 |

OTHER PUBLICATIONS

Jukart, Matjaz, Supplementary European Search Report, Aug. 25, 2009.

* cited by examiner

*Primary Examiner*—Melvin C Mayes
*Assistant Examiner*—Melissa Stalder
(74) *Attorney, Agent, or Firm*—Chernoff, Vilhauer, McClung & Stenzel, LLP

(57) ABSTRACT

The present invention relates to a method for the treatment of copper-bearing materials, such as copper concentrates, so that the impurities and gangue minerals in the materials, such as silicates, are in effect removed completely.

21 Claims, 2 Drawing Sheets